US012300043B1

(12) United States Patent
Schmitt et al.

(10) Patent No.: US 12,300,043 B1
(45) Date of Patent: May 13, 2025

(54) ROADSIDE ASSISTANCE DETECTION

(71) Applicant: Allstate Insurance Company, Northbrook, IL (US)

(72) Inventors: Kyle Patrick Schmitt, Chicago, IL (US); David Lambert, La Grange, IL (US); Bennett Hansen, Northbrook, IL (US); David Grady, Northbrook, IL (US); Rachael Rubin, Northbrook, IL (US); Dipti Karmarkar, Hoffman Estates, IL (US); Christopher Ciesielski, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 470 days.

(21) Appl. No.: 16/926,135

(22) Filed: Jul. 10, 2020

Related U.S. Application Data

(60) Provisional application No. 62/873,465, filed on Jul. 12, 2019.

(51) Int. Cl.
*G07C 5/00* (2006.01)
*G01C 21/00* (2006.01)
(Continued)

(52) U.S. Cl.
CPC .............. *G07C 5/02* (2013.01); *G01C 21/28* (2013.01); *G01S 19/254* (2013.01); *G01S 19/52* (2013.01);
(Continued)

(58) Field of Classification Search
CPC .......... G07C 5/02; G07C 5/008; G07C 5/006; G01C 21/28; G01S 19/254; G01S 19/52;
(Continued)

(56) References Cited

U.S. PATENT DOCUMENTS 7,119,669 B2  10/2006  Lundsgaard et al.
8,019,629 B1   9/2011  Medina, III et al.
(Continued)

FOREIGN PATENT DOCUMENTS

| EP | 2955484 A1 | 12/2015 |
| WO | 2014134148 A2 | 9/2014 |
| WO | 2014134148 A3 | 10/2014 |

OTHER PUBLICATIONS

Nov. 18, 2020—(IN) 1st Examination Report—App. No. 20187025309.
(Continued)

*Primary Examiner* — Tiffany P Young

(74) *Attorney, Agent, or Firm* — Akerman LLP

(57) ABSTRACT

Systems and methods in accordance with embodiments of the invention can proactively determine if a vehicle has stopped during a trip and calculate a likelihood that the vehicle is in need of roadside assistance. Information can be collected from a variety of devices, such as mobile phones, including the vehicle's location, the type of road, passing vehicles, and/or ambient noise. The likelihood of needing roadside assistance can be determined based on a configurable probability that the vehicle is experiencing a roadside event. The arrangements described herein provide for receiving and processing data in real-time to efficiently and accurately detect stopped vehicles, determine whether the vehicle is stopped for an urgent or non-urgent situation reason, and provide assistance accordingly.

19 Claims, 8 Drawing Sheets

(51) Int. Cl.
*G01C 21/28* (2006.01)
*G01S 19/00* (2010.01)
*G01S 19/25* (2010.01)
*G01S 19/52* (2010.01)
*G06N 20/00* (2019.01)
*G06Q 30/016* (2023.01)
*G07C 5/02* (2006.01)
*G08G 1/01* (2006.01)
*G08G 1/052* (2006.01)

(52) U.S. Cl.
CPC ........... *G06N 20/00* (2019.01); *G06Q 30/016* (2013.01); *G07C 5/008* (2013.01); *G08G 1/0133* (2013.01); *G08G 1/052* (2013.01); *G07C 5/006* (2013.01)

(58) Field of Classification Search
CPC .... G06N 20/00; G06Q 30/016; G08G 1/0133; G08G 1/052
USPC .......................................................... 701/512
See application file for complete search history.

(56) References Cited

U.S. PATENT DOCUMENTS

| | | | |
|---|---|---|---|
| 8,332,242 B1 | 12/2012 | Medina, III | |
| 8,862,092 B2 | 10/2014 | Reitnour | |
| 9,581,461 B1 | 2/2017 | Chintakindi et al. | |
| 9,628,975 B1* | 4/2017 | Watkins | H04W 4/027 |
| 9,697,525 B1* | 7/2017 | Kozlowski | G06F 3/04842 |
| 9,749,812 B1* | 8/2017 | Dulee | G06F 16/951 |
| 9,767,625 B1 | 9/2017 | Snyder et al. | |
| 9,771,082 B2 | 9/2017 | Farrell et al. | |
| 9,773,281 B1 | 9/2017 | Hanson | |
| 9,818,239 B2 | 11/2017 | Pal et al. | |
| 9,832,241 B1 | 11/2017 | Hayward | |
| 9,955,319 B2 | 4/2018 | Matus et al. | |
| 10,036,650 B2 | 7/2018 | Chintakindi et al. | |
| 10,077,056 B1 | 9/2018 | Fields et al. | |
| 10,560,823 B1* | 2/2020 | Chen | G08G 1/127 |
| 10,963,966 B1* | 3/2021 | Brandmaier | G06Q 40/08 |
| 2002/0016667 A1 | 2/2002 | Baur et al. | |
| 2003/0060977 A1 | 3/2003 | Jijina et al. | |
| 2007/0208493 A1* | 9/2007 | Downs | G08G 1/0104 701/117 |
| 2008/0082261 A1 | 4/2008 | Tengler et al. | |
| 2009/0271325 A1 | 10/2009 | Wilson | |
| 2010/0299064 A1* | 11/2010 | Hilbrandie | G08G 1/096888 701/533 |
| 2010/0332133 A1* | 12/2010 | Harris | H04L 67/52 455/466 |
| 2011/0077028 A1 | 3/2011 | Wilkes, III et al. | |
| 2012/0123806 A1 | 5/2012 | Schumann, Jr. et al. | |
| 2012/0166229 A1 | 6/2012 | Collins et al. | |
| 2012/0303203 A1* | 11/2012 | Olsen | G08G 1/0133 701/423 |
| 2013/0069802 A1 | 3/2013 | Foghel et al. | |
| 2013/0226441 A1 | 8/2013 | Horita | |
| 2014/0062725 A1 | 3/2014 | Maston | |
| 2014/0074402 A1 | 3/2014 | Hassib et al. | |
| 2014/0266789 A1 | 9/2014 | Matus | |
| 2015/0084757 A1 | 3/2015 | Annibale et al. | |
| 2015/0127388 A1 | 5/2015 | Oldham | |
| 2016/0086285 A1 | 3/2016 | Jordan Peters et al. | |
| 2016/0104328 A1 | 4/2016 | Chen et al. | |
| 2016/0171521 A1 | 6/2016 | Ramirez et al. | |
| 2016/0171621 A1 | 6/2016 | Bogovich et al. | |
| 2016/0232797 A1 | 8/2016 | Wiesemann et al. | |
| 2016/0358477 A1 | 12/2016 | Ansari | |
| 2017/0164158 A1 | 6/2017 | Watkins et al. | |
| 2017/0221149 A1 | 8/2017 | Hsu-Hoffman et al. | |
| 2019/0316926 A1* | 10/2019 | Wang | G01C 21/3438 |
| 2019/0347805 A1* | 11/2019 | Potthast | G06T 7/246 |
| 2019/0371182 A1* | 12/2019 | England | B60W 40/105 |
| 2020/0209873 A1* | 7/2020 | Chen | G05D 1/0221 |
| 2020/0340825 A1* | 10/2020 | Yamamoto | G09B 29/106 |
| 2020/0393267 A1* | 12/2020 | Pandit | G06V 20/584 |
| 2020/0400840 A1* | 12/2020 | Knitt | B60W 30/143 |

OTHER PUBLICATIONS

Feb. 2, 2017 (PCT) Notification of Transmittal of the International Search Report and The Written Opinion—App PCT/US17/12016.
Feb. 6, 2017—(WO) International Search Report and Written Opinion—PCT/US17/12029.
Kumar et al, Automatic Vehicle Accident Detection and Rescue System, International Journal for Research in Applied Science & Engineering Technology (IJRASET), vol. 4, Issue IV, Apr. 2016, p. 592-596.
Ali et al, Car Accident Detection and Notification System Using Smartphone, International Journal of Computer Science and Mobile Computing (IJCSMC), vol. 4, Issue 4, Apr. 2015, p. 620-635.
Saymum Ahmmed Sany et al, IoT Based Vehicle Accident Detection & Rescue Information System, Dept. of Computer Science & Engineering (CSE), East West University, Dhaka, Bangladesh, Aug. 2017, p. i-68.
Priyanga et al, Sensor Based Accident Detection and Prevention Technology, International Journal of Advanced Technology in Engineering and Science, vol. 2, Issue 11, Nov. 2014, p. 156-161.
Feb. 2, 2017 (WO) International Search Report and Written Opinion—App PCT/US17/12016.
May 9, 2019—(CA) Office Action—Application No. 3010433.
Jul. 12, 2019—(EP) Extended Search Report—Application No. EP17736191.
Aug. 1, 2019 (EP) Extended Search Report—Application No. EP17736197.9.
Nov. 14, 2019—(WO) International Search Report & Written Opinion—PCT/US19/054540.
Jun. 8, 2020—(EP) Office Action—App. No. 17736191.2.
Dec. 21, 2020—(IN) Examination Report—App. No. 201827025677.

* cited by examiner

ROADSIDE ASSISTANCE DETECTION

CROSS-REFERENCE TO RELATED APPLICATIONS

The instant application claims priority to U.S. Provisional Patent No. 62/873,465, titled "Roadside Assistance Detection" and filed Jul. 12, 2019, the disclosure of which is hereby incorporated by reference in its entirety.

FIELD OF INVENTION

Aspects of the disclosure relate to data processing systems and more specifically to processing vehicular data.

BACKGROUND

Vehicles, such as automobiles, can stop along a roadside for various different reasons such as a rest stop, because the driver has missed an exit, or for various emergency reasons, such as a flat tire, low fuel, out of fuel, collision, and/or other mechanical issues. Obtaining roadside assistance can be difficult when in an unfamiliar area. Conventional systems can offer roadside assistance but often do not distinguish between vehicles being stopped for an urgent situation or a non-urgent situation.

SUMMARY OF THE INVENTION

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Systems and methods in accordance with embodiments of the invention can proactively determine if a vehicle has stopped during a trip and calculate a likelihood that the vehicle is in need of roadside assistance. Information can be collected from a variety of devices, such as mobile phones, including the vehicle's location, the type of road, passing vehicles, and/or ambient noise. The likelihood of needing roadside assistance can be determined based on a configurable probability that the vehicle is experiencing a roadside event. The arrangements described herein provide for receiving and processing data in real-time to efficiently and accurately detect stopped vehicles, determine whether the vehicle is stopped for an urgent or non-urgent situation reason, and provide assistance accordingly.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
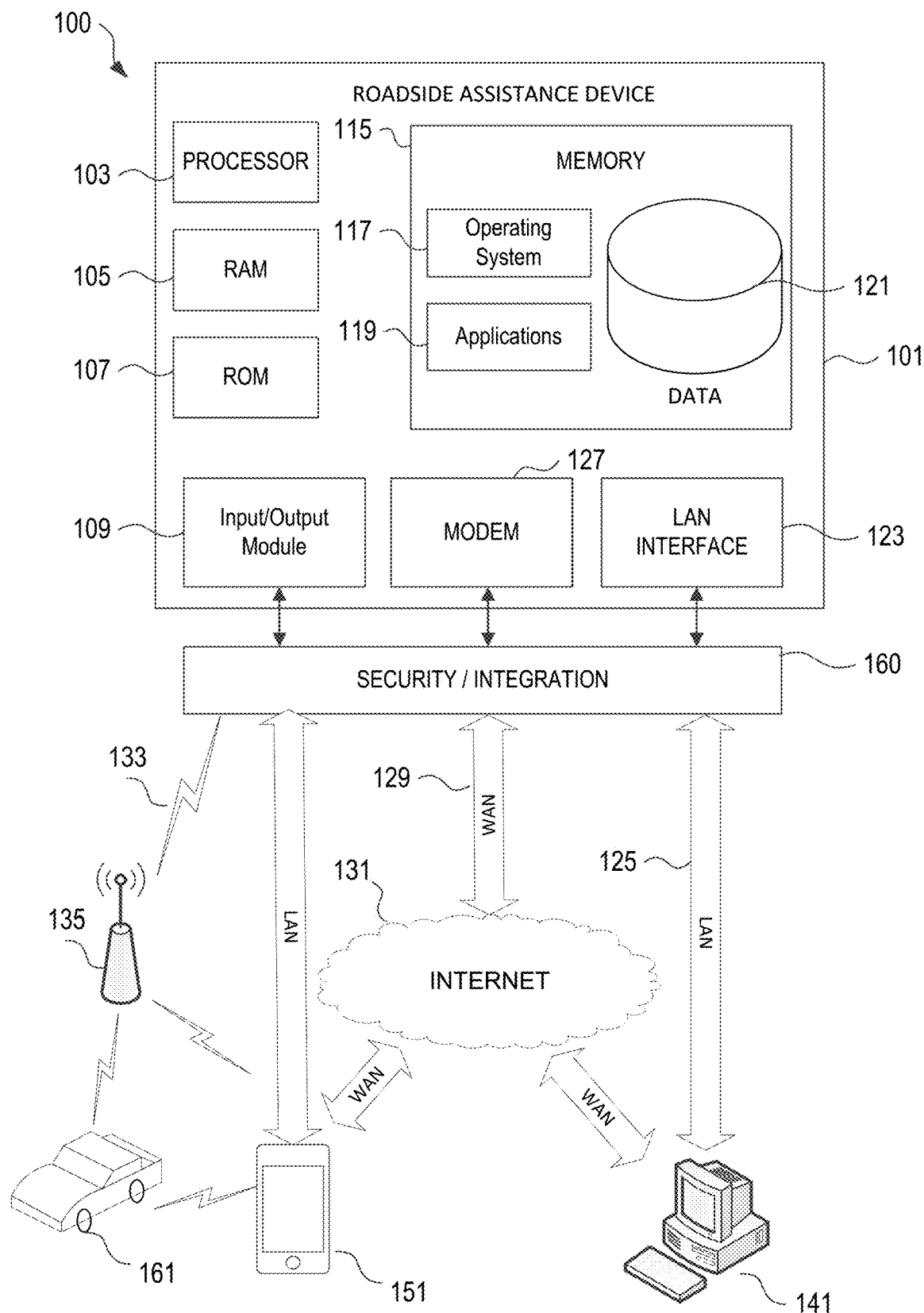
FIG. 1 illustrates one example operating environment in which one or more aspects described herein can be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

As will be discussed more fully herein, arrangements described herein are directed to determining a location of a vehicle, determining a reason the vehicle is stopped, and generating and transmitting one or more different types of notifications. Conventional roadside assistance systems often require a user to provide information about an issue that has occurred, request assistance, or the like. If stopped in an emergency situation on a highway, this can be difficult for a user and sometimes dangerous. Accordingly, it is advantageous to detect issues that have caused a vehicle to stop along a highway and automatically provide assistance if the reason for stopping is urgent or provide an offer of assistance or additional information if the reason for stopping is not urgent. Additionally, conventional roadside assistance systems typically utilize specialized hardware installed in the vehicle. The use of specialized hardware limits the number of vehicles that can be utilized and requires drivers to invest in expensive hardware in order to obtain roadside assistance.

Systems and methods in accordance with embodiments of the invention can proactively determine if a vehicle has stopped during a trip and make predictive recommendations regarding roadside assistance for the vehicle. Roadside assistance can be provided for any kind of road, such as local routes, state routes, rural routes, parking lots, highways, interstates, etc. Information can be collected from the individual's mobile device, including the person's location, the type of road, and/or ambient noise. In a variety of embodiments, by utilizing the individual's mobile device, roadside assistance can be provided to any vehicle without the need for dedicated systems to be installed in the vehicle. If it is determined that the individual likely needs roadside assistance, the system can proactively contact the individual to see if roadside assistance is desired, and if so, initiates roadside assistance. The likelihood of needing roadside assistance can be determined based on a configurable probability that the individual's vehicle is experiencing a roadside event. A variety of data, including the motion of wireless devices in proximity to the vehicle, can be used to determine a probability that a roadside event has occurred. The system also can provide helpful information, such as safety information, and/or automatically contact other individuals, such as family members, friends, and/or co-workers, to alert them of the roadside event and the location of the individual. The alerts can be used to automatically initiate roadside assistance for the vehicle and/or contact the individual.

These and various other arrangements will be described more fully herein.

Roadside Assistance Systems

FIG. 1 illustrates a block diagram a roadside assistance device 101 in a roadside assistance system 100 in accordance with an embodiment of the invention. The roadside assistance device 101 can have a processor 103 for controlling overall operation of the device 101 and its associated components, including RAM 105, ROM 107, input/output module 109, and memory 115. The roadside assistance device 101, along with one or more additional devices (e.g., terminal 141, mobile device 151, and/or security and integration hardware 160) can correspond to any of multiple systems or devices described herein, such as personal mobile devices, vehicle-based computing devices, insurance systems servers, roadside assistance provider servers, roadside assistance servers, internal data sources, external data sources and other various devices in a roadside assistance system. These various computing systems can be configured individually or in combination, as described herein, for receiving signals and/or transmissions from one or more computing devices, the signals or transmissions including data related to location of a vehicle, operating parameters of a vehicle, and the like, processing the signals or transmissions to determine a location of the vehicle, operating parameters of the vehicle, a cause of an issue associated with the vehicle, and the like, using the devices of the roadside assistance systems described herein. In addition to the features described above, the techniques described herein also can be used for generating and displaying one or more different types of notifications, transmitting a request for assistance to a service center computing device, and the like.

Input/output (I/O) 109 can include a microphone, keypad, touch screen, and/or stylus through which a user of the roadside assistance device 101 can provide input, and can also include one or more of a speaker for providing audio output and a video display device for providing textual, audiovisual, and/or graphical output. Software can be stored within memory 115 and/or storage to provide instructions to processor 103 allowing roadside assistance device 101 to perform various actions. For example, memory 115 can store software used by the device 101, such as an operating system 117, application programs 119, and/or an associated internal database 121. The various hardware memory units in memory 115 can include volatile and nonvolatile, removable and non-removable media implemented in any method or technology for storage of information such as computer-readable instructions, data structures, program modules or other data. Certain devices and systems within roadside assistance systems can have minimum hardware requirements in order to support sufficient storage capacity, processing capacity, analysis capacity, network communication, etc. Memory 115 also can include one or more physical persistent memory devices and/or one or more non-persistent memory devices. Memory 115 can include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 can include a single central processing unit (CPU), which can be a single-core or multi-core processor (e.g., dual-core, quad-core, etc.), or can include multiple CPUs. Processor(s) 103 and its associated components can allow the roadside assistance device 101 to execute a series of computer-readable instructions, for example, receive signals or transmissions including location information, vehicle operation information, scan for diagnostic codes, and the like, to determine a location of the vehicle, determine a cause of an issue associated with the vehicle, control amount and type of data received, and the like.

The mobile device 151 (e.g., a personal mobile device, vehicle-based system, insurance system server, roadside assistance server, etc.) can operate in a networked environment 100 supporting connections to one or more remote computers, such as terminals 141, 151, and 161. Such terminals can be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which can include some or all of the elements described above with respect to the roadside assistance device 101. The network connections depicted in FIG. 1 include a local area network (LAN) 125, a wide area network (WAN) 129, and a wireless telecommunications network 133, but can also include fewer or additional networks. When used in a LAN networking environment, the roadside assistance device 101 can be connected to the LAN 125 through a network interface or adapter 123. When used in a WAN networking environment, the roadside assistance device 101 can include a modem 127 or other means for establishing communications over the WAN 129, such as network 131 (e.g., the Internet). When used in a wireless telecommunications network 133, the roadside assistance device 101 can include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133. It should be noted that, in a variety of embodiments, the roadside assistance device 101 is implemented using mobile device 151. In many embodiments, the roadside assistance device 101 communicates with mobile device 151 to cooperatively implement and perform the systems and methods described herein.

Also illustrated in FIG. 1 is a security and integration layer 160, through which communications are sent and managed between the roadside assistance device 101 (e.g., a personal mobile device, a vehicle-based computing device, a roadside assistance server or computing platform, an intermediary server, and/or external data source servers, etc.) and the remote devices (141, 151, and 161) and remote networks (125, 129, and 133). The security and integration layer 160 can include one or more separate computing devices, such as web servers, authentication servers, and/or various networking components (e.g., firewalls, routers, gateways, load balancers, etc.), having some or all of the elements described above with respect to the roadside assistance device 101. As an example, a security and integration layer 160 of a roadside assistance device 101 can include a set of web application servers configured to use secure protocols and to insulate the roadside assistance device 101 from external devices 141, 151, and 161. In some cases, the security and integration layer 160 can correspond to a set of dedicated hardware and/or software operating at the same physical location and under the control of same entities as roadside assistance device 101. For example, security and integration layer 160 can correspond to one or more dedicated web servers and network hardware in a vehicle and driver information datacenter or in a cloud infrastructure supporting cloud-based vehicle identification, location identification, vehicle operational parameters identification, issue detection, and the like. In other examples, the security and integration layer 160 can correspond to separate hardware and software components which can be operated at a separate physical location and/or by a separate entity.

As discussed herein, the data transferred to and from various devices in a roadside assistance system 100 can include secure and sensitive data, such as confidential vehicle operation data, insurance policy data, and confidential user data from drivers and passengers in vehicles. Therefore, it can be desirable to protect transmissions of such data using secure network protocols and encryption, and also to protect the integrity of the data when stored on the various devices within a system, such as mobile devices, vehicle-based devices, insurance servers, roadside assistance servers, external data source servers, or other computing devices in the roadside assistance system 100, using the security and integration layer 160 to authenticate users and restrict access to unknown or unauthorized users. In various implementations, security and integration layer 160 can provide, for example, a file-based integration scheme or a service-based integration scheme for transmitting data between the various devices in roadside assistance system 100. Data can be transmitted through the security and integration layer 160, using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In other examples, one or more web services can be implemented within the various roadside assistance devices 101 in the roadside assistance system 100 and/or the security and integration layer 160. Web services can be accessed by authorized external devices and users to support input, extraction, and manipulation of the data (e.g., vehicle data, driver data, location data, breakdown issue data, etc.) between the various devices in the roadside assistance system 100. Web services built to support a personalized display system can be cross-domain and/or cross-platform, and can be built for enterprise use. Such web services can be developed in accordance with various web service standards, such as the Web Service Interoperability (WS-I) guidelines. In some examples, a driver data, vehicle data, location data, breakdown issue data and/or breakdown data analysis web service, or the like, can be implemented in the security and integration layer 160 using the Secure Sockets Layer (SSL) or Transport Layer Security (TLS) protocol to provide secure connections between roadside assistance devices 101 and various clients 141, 151, and 161. SSL or TLS can use HTTP or HTTPS to provide authentication and confidentiality. In other examples, such web services can be implemented using the WS-Security standard, which provides for secure SOAP messages using XML encryption. In still other examples, the security and integration layer 160 can include specialized hardware for providing secure web services. For example, secure network appliances in the security and integration layer 160 can include built-in features such as hardware-accelerated SSL and HTTPS, WS-Security, and firewalls. Such specialized hardware can be installed and configured in the security and integration layer 160 in front of the web servers, so that any external devices can communicate directly with the specialized hardware.

Although not shown in FIG. 1, various elements within memory 115 or other components in system 100, can include one or more caches, for example, CPU caches used by the processing unit 103, page caches used by the operating system 117, disk caches of a hard drive, and/or database caches used to cache content from database 121. For embodiments including a CPU cache, the CPU cache can be used by one or more processors in the processing unit 103 to reduce memory latency and access time. In such examples, a processor 103 can retrieve data from or write data to the CPU cache rather than reading/writing to memory 115, which can improve the speed of these operations. In some examples, a database cache can be created in which certain data from a database 121 (e.g., a database of driver data, database of vehicle information, database of location information, database of breakdown issue information, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of roadside assistance systems, such as faster response times and less dependence on network conditions when transmitting and receiving driver information, vehicle information, location information, roadside assistance issue information, and the like.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices in roadside assistance system components described herein can be configured to communicate using any of these network protocols or technologies.

Additionally, one or more application programs 119 can be used by the various roadside assistance devices 101 within the roadside assistance system 100 (e.g., vehicle data, driver data, location data, roadside assistance issue data, and/or roadside assistance applications, etc.), including computer executable instructions for receiving and analyzing various signals or transmissions including location information, vehicle operating data, other vehicle operating data, and the like, determining a location of a vehicle, determining a cause of an issue, controlling an amount or type of data transmitted or received and the like.

Figure 2:
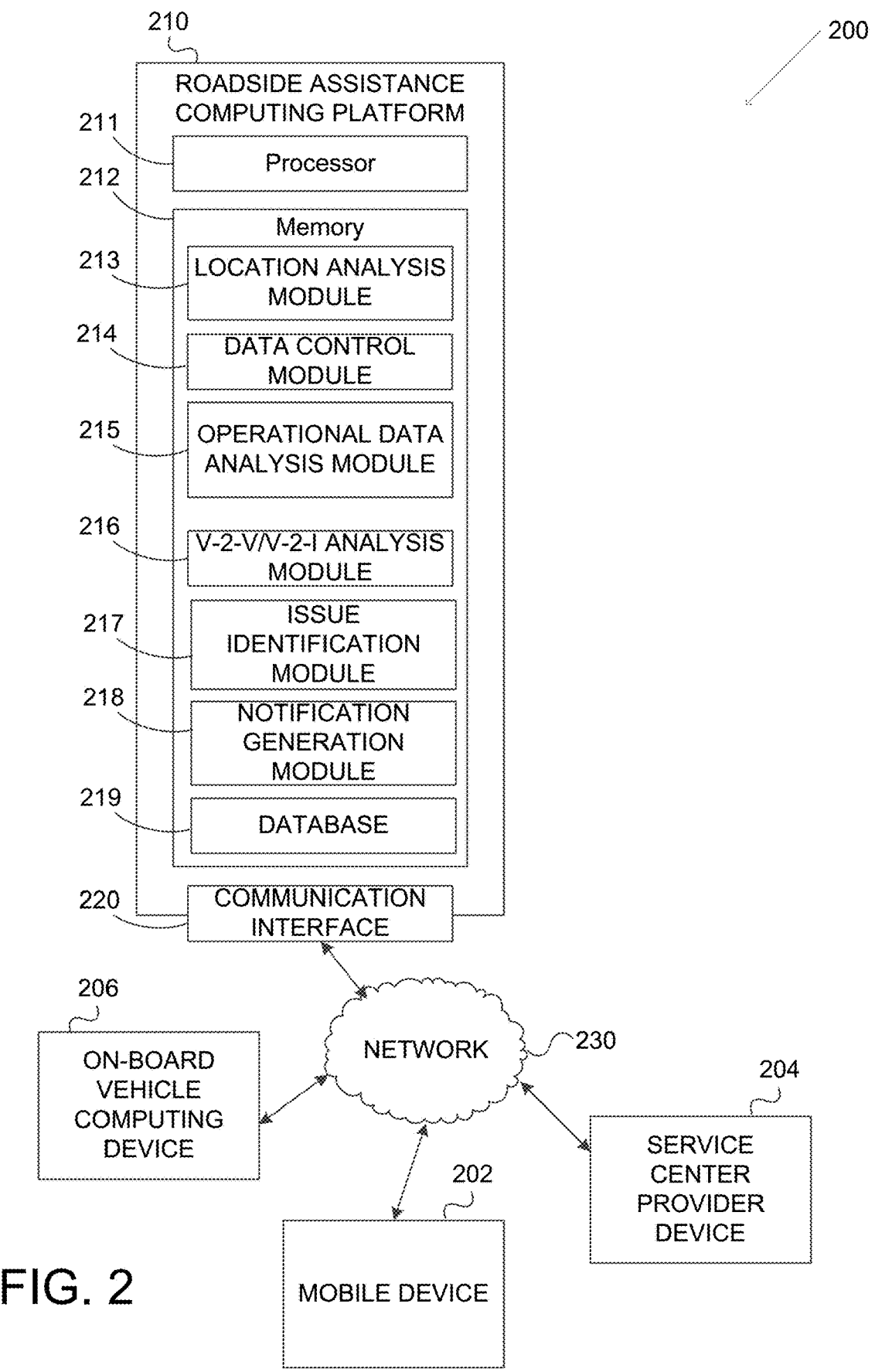
FIG. 2 illustrates one example roadside assistance system in accordance with one or more aspects described herein.

FIG. 2 depicts an environment 200 including an illustrative roadside assistance computing platform 210 for determining a location of a vehicle, determining that the vehicle is stopped, identifying an issue causing the vehicle to stop, and generating and transmitting one or more notifications based on the determined issue, according to one or more aspects described herein. For instance, the environment 200 includes a roadside assistance computing platform 210, which can include one or more processors 211, memory 212, and communication interface 220. A data bus can interconnect processor(s) 211, memory 212, and communication interface 220. Communication interface 220 can be a network interface configured to support communication between roadside assistance computing platform 210 and one or more networks (e.g., network 230). One or more computing destinations 202, 204, 206 can be in communication with the roadside assistance computing platform 210 (e.g., via network 230). Memory 212 can include one or more program modules having instructions that when executed by processor(s) 211 cause roadside assistance computing platform 210 to perform one or more functions described herein and/or one or more databases that can store and/or otherwise maintain information which can be used by such program modules and/or processor(s) 211. In some instances, the one or more program modules and/or databases can be stored by and/or maintained in different memory units of roadside assistance computing platform 210 and/or by different computer systems that can form and/or otherwise make up the roadside assistance computing platform 210. In some arrangements, different features or processes performed can be performed by different sets of instructions, such that the processor can execute each desired set of instructions to perform different functions described herein.

For example, memory 212 can include a location analysis module 213. The location analysis module 213 can receive data (e.g., signals or other electronic transmissions), for example, in real-time, including location information of a vehicle. In some examples, the location data can be received from a mobile device 202, which can include, for example, a smartphone, cell phone, tablet computing device, or the like, associated with the user and currently located with or within the vehicle. Global positioning system (GPS) data can be received from the mobile device 202 and processed to determine a current location of the vehicle, which can aid in determining whether the vehicle is currently located on a highway. In another example, GPS data can be received from one or more sensors located within the vehicle and transmitted via an on-board vehicle computing device 206. The data received can be processed to determine the current location of the vehicle.

Memory 212 can further include a data control module 214. Data control module 214 can be configured to control an amount or type of data collected by one or more sensors, transmitted to roadside assistance computing platform 210, or the like. For example, based on location analysis, vehicle operation data, and the like, the data control module 214 can increase or decrease (e.g., limit) an amount or type of data collected by one or more sensors (e.g., vehicle sensors, user computing device sensors, or the like). In some examples, the data control module 214 can determine an amount or type of data to be collected by the sensors or transmitted to the roadside assistance computing platform 210 and can transmit a command or instruction to a computing device associated with the sensors, such as on-board vehicle computing device 206, user computing device 202, or the like, controlling the amount or type of data collected. Accordingly, if a vehicle is determined to not be traveling on a highway, the data control module 214 can limit the amount of data transmitted to the roadside assistance computing platform 210 for processing to improve efficiency, conserve computing resources, and the like. Alternatively, if a vehicle is determined to be traveling on a highway, the data control module 214 can increase an amount or type of data collected by sensors and/or transmitted to the roadside assistance computing platform 210 to evaluate operational parameters of the vehicle, determine whether the vehicle is stopped, determine a cause or type of issue causing the vehicle to stop, and the like.

Memory 212 can further include an operational data analysis module 215. Operational data analysis module 215 can be configured to receive data (e.g., signals or other electronic transmissions), for example, in real-time, associated with operating parameters of the vehicle. For instance, data such as current speed, recent historical speeds, location, and the like, can be received by the operational data analysis module 215 and processed to evaluate operational parameters of the vehicle (e.g., to determine whether the vehicle is stopped). In some examples, data can be received from sensors in a user computing device 202. Data can be received from one or more vehicle-based sensors and transmitted via an on-board vehicle computing device 206, telematics device, mobile device 202, or the like.

Memory 212 can further include vehicle-to-vehicle or vehicle-to-infrastructure data analysis module 216. The vehicle-to-vehicle or vehicle-to-infrastructure data analysis module 216 can be configured to receive data via short range vehicle-to-vehicle and/or vehicle-to-infrastructure communications to evaluate operating parameters of other vehicle at or near a location of the vehicle. For instance, the vehicle-to-vehicle or vehicle-to-infrastructure data analysis module 216 can receive data from one or more other vehicles, infrastructure, or the like, at or near a location of the vehicle being evaluated to determine whether the other vehicles are, for example, also stopped or are still moving and, if so, at what speed. This can aid in determining whether the vehicle being evaluated is stopped due to heavy traffic as opposed to being stopped because of an emergency, breakdown, or the like.

Memory 212 can further include issue identification module 217. Issue identification module 217 can be configured to receive data (e.g., signals or other electronic transmissions) to determine whether an issue with a vehicle has occurred and, if so, to determine whether the cause of the issue is an urgent situation reason or a non-urgent situation reason. For example, the issue identification module 217 can receive data indicating that a vehicle is stopped on a highway, that other traffic around the vehicle is still moving, and that the vehicle has not exited the highway. Accordingly, the issue identification module 217 can scan (e.g., in real-time) the diagnostic codes of the vehicle to determine whether one or more diagnostic codes have been activated. If so, the issue identification module 217 can determine that the vehicle is stopped for an urgent situation reason (e.g., low tire pressure, low fuel, low battery power, low oil level, or the like). If no diagnostic codes have been activated, in some examples, the issue identification module 217 can determine that the vehicle is stopped for a non-urgent situation reason (e.g., to place a phone call, to address an issue within the vehicle, or the like). In many embodiments, a mobile device includes one or more sensors capable of determining diagnostic codes for the vehicle (and/or any of the information described by the diagnostic codes) without a connection to the on-board vehicle diagnostic system. In this way, it should be understood that any vehicle data described herein can be captured and/or generated using a mobile device.

Memory 212 can further include a notification generation module 218. Notification generation module 218 can be configured to generate, transmit and/or cause to display one or more different types of notifications based on whether the vehicle is stopped for an urgent situation reason or a non-urgent situation reason. For instance, if the vehicle is stopped for an urgent situation reason (e.g., as determined by the issue identification module 217), a request for assistance can be transmitted to a service center computing device 204 and a notification can be generated and transmitted to the user computing device 202, on-board vehicle computing device 206, or the like, indicating that an issue has been detected and that a request for assistance has been sent. In some examples, the notification can include an estimated time of arrival of assistance. Accordingly, in at least some aspects, if it is determined that the vehicle is stopped for an urgent situation reason, the roadside assistance computing platform 210 can automatically request roadside assistance for the vehicle (e.g., without additional user input). If it is determined (e.g., by the issue determination module 217) that the vehicle is stopped for a non-urgent situation reason, a second type of notification can be generated and transmitted to a device. The second type of notification can be different from the first type of notification. For instance, the second type of notification can indicate that the system has recognized that the vehicle is stopped, can request user input confirming that there is no emergency or urgent situation, can provide information about a surrounding area, and the like. The generated notifications can be transmitted to one or more computing devices, e.g., devices 202, 204, 206, via push notifications, short message service (SMS), via an application executing one or more devices 202, 204, 206, or the like. The roadside assistance computing platform 210 can cause the notifications to display on a display of the one or more computing devices 202, 204, 206.

Roadside assistance computing platform 210 can further include a database 219. The database 219 can include or store information associated with the driver of the vehicle, the vehicle itself, insurance policy information, historical issues detected, and the like. This information can be used to aid in determining when an issue has occurred, what type of issue, and the like. For instance, historical data can indicate that that the vehicle has previously stopped in a same or similar location. Accordingly, this can indicate that the vehicle is stopped for a non-urgent situation reason.

Although the various modules of the roadside assistance computing platform 210 are described separately, functionality of the various modules can be combined and/or can be performed by a single device or multiple computing devices in communication without departing from the invention. In particular, it should be noted that the roadside assistance computing platform can be implemented in whole or in part by mobile device 202.

Figure 3:
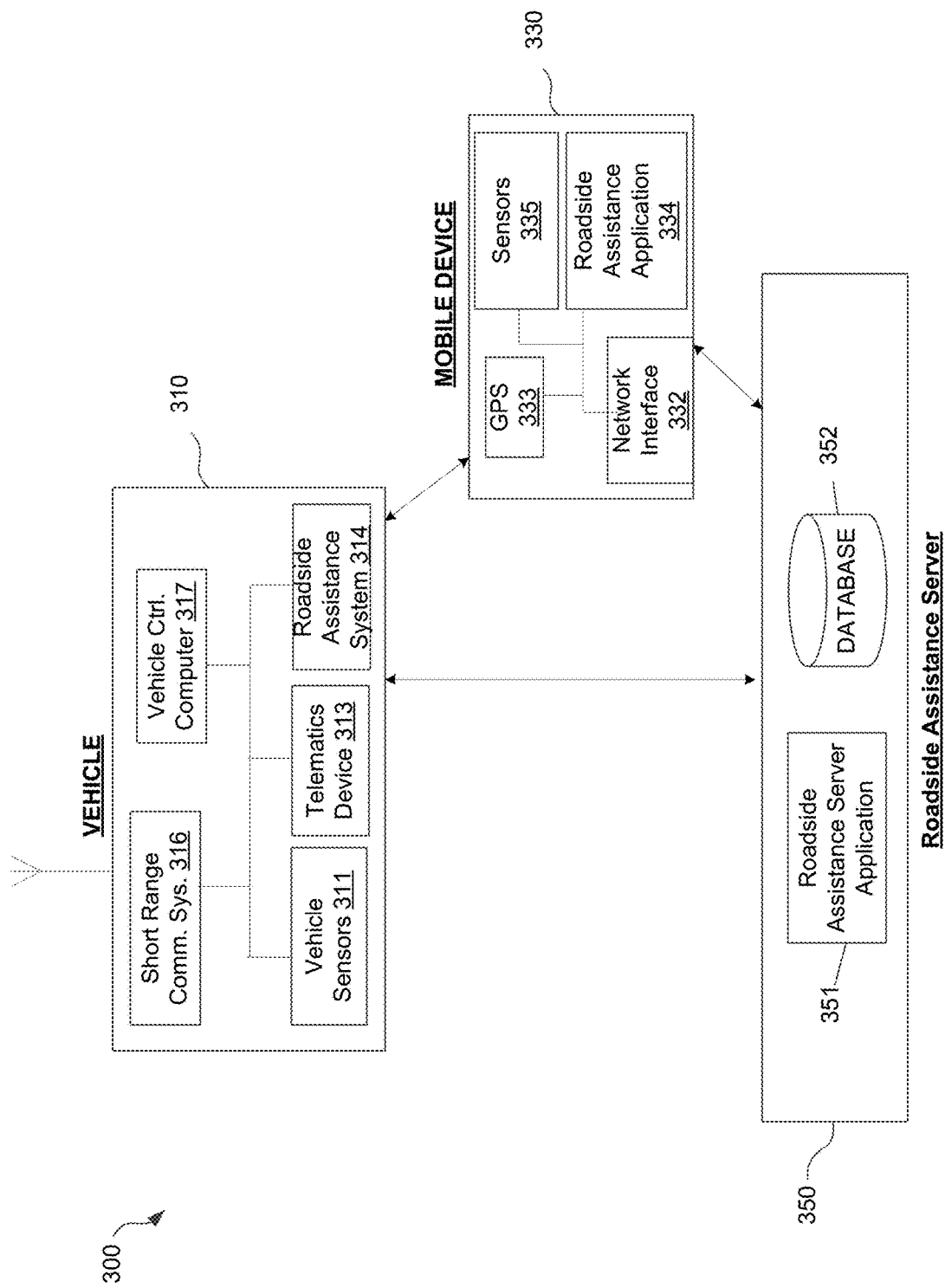
FIG. 3 is another example roadside assistance system in accordance with one or more aspects described herein.

FIG. 3 is a diagram of an illustrative roadside assistance system 300. The roadside assistance system 300 includes a vehicle 310 (e.g., the vehicle being evaluated for potential breakdown), a mobile device 330, a roadside assistance server 350, and additional related components. As discussed herein, the components of the system 300, individually or using communication and collaborative interaction, can determine a location of vehicle 310, determine whether the vehicle has stopped, control an amount or type of data received and/or processed, determine whether the vehicle is stopped for an urgent situation reason or a non-urgent situation reason, and generate and transmit one or more notifications. To perform such functions, the components shown in FIG. 3 each can be implemented in hardware, software, or a combination of the two. Additionally, each component of the roadside assistance system 300 can include a computing device (or system) having some or all of the structural components described herein for mobile device 330.

Vehicle 310 in the roadside assistance system 300 can be, for example, an automobile, a motorcycle, a scooter, a bus, a recreational vehicle, a boat, or other vehicle for which vehicle data, location data, driver data (or operator data), operational data and/or other driving data (e.g., location data, time data, weather data, etc.) can be collected and/or analyzed. The vehicle 310 includes vehicle operation sensor 311 capable of detecting and recording various conditions at the vehicle and operational parameters of the vehicle. For example, sensor 311 can detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 311 also can detect and store data received from the vehicle's 310 internal systems, such as impact to the body of the vehicle, air bag deployment, tire status, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (e.g. OBD, OBD II).

Additional sensors 311 can detect and store the external driving conditions, for example, external temperature, rain, snow, light levels, and sun position for driver visibility. For example, external cameras and proximity sensors 311 can detect other nearby vehicles, vehicle spacing, traffic levels, road conditions, traffic obstructions, animals, cyclists, pedestrians, and other conditions that can factor into a roadside assistance analysis. Sensor 311 also can detect and store data relating to moving violations and the observance of traffic signals and signs by the vehicle 310. Additional sensors 311 can detect and store data relating to the maintenance of the vehicle 310, such as the engine status, oil level, engine coolant temperature, odometer reading, the level of fuel in the fuel tank, engine revolutions per minute, software upgrades, and/or tire pressure.

Vehicles sensor 311 also can include cameras and/or proximity sensors capable of recording additional conditions inside or outside of the vehicle 310. For example, internal cameras can detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 311 also can be configured to collect data identifying a current driver from among a number of different possible drivers, for example, based on driver's seat and mirror positioning, driving times and routes, radio usage, etc. Voice/sound data along with directional data also can be used to determine a seating position within a vehicle 310. Sensor 311 also can be configured to collect data relating to a driver's movements or the condition of a driver. For example, vehicle 310 can include sensors that monitor a driver's movements, such as the driver's eye position and/or head position, etc. Additional sensors 311 can collect data regarding the physical or mental state of the driver, such as fatigue or intoxication. The condition of the driver can be determined through the movements of the driver or through other sensors, for example, sensors that detect the content of alcohol in the air or blood alcohol content of the driver, such as a breathalyzer, along with other biometric sensors.

Certain vehicle sensors 311 also can collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 311 can determine when and how often the vehicle 310 stays in a single lane or strays into another lane. A Global Positioning System (GPS), locational sensors positioned inside the vehicle 310, and/or locational sensors or devices external to the vehicle 310 can be used to determine the route, speed, lane position, road-type (e.g. highway, entrance/exit ramp, residential area, etc.) and other vehicle position/location data.

The data collected by vehicle sensor 311 can be stored and/or analyzed within the vehicle 310, such as for example by a roadside assistance system 314 integrated into the vehicle, and/or can be transmitted to one or more external devices. For example, as shown in FIG. 3, sensor data can be transmitted via a telematics device 313 to one or more remote computing devices, such as personal mobile device 330, roadside assistance server 350, and/or other remote devices.

As shown in FIG. 3, the data collected by vehicle sensor 311 can be transmitted to roadside assistance server 350, mobile device 330, and/or additional external servers and devices via telematics device 313. As discussed herein, the telematics device 313 can receive vehicle operation data and driving data from vehicle sensor 311, and can transmit the data to one or more external computer systems (e.g., roadside assistance server 350 of an insurance provider, financial institution, or other entity) over a wireless transmission network. Telematics device 313 also can be configured to detect or determine additional types of data relating to real-time driving and the condition of the vehicle 310. The telematics device 313 also can store the type of vehicle 310, for example, the make, model, trim (or sub-model), year, and/or engine specifications, as well as other information such as vehicle owner or driver information, insurance information, and financing information for the vehicle 310. In the example shown in FIG. 3, telematics device 313 can receive vehicle driving data from vehicle sensor 311, and can transmit the data to a roadside assistance server 350. However, in other examples, one or more of the vehicle sensors 311 or systems can be configured to receive and transmit data directly from or to a roadside assistance server 350 without using a telematics device. For instance, telematics device 313 can be configured to receive and transmit data from certain vehicle sensors 311 or systems, while other sensors or systems can be configured to directly receive and/or transmit data to a roadside assistance server 350 without using the telematics device 313. Thus, telematics device 313 can be optional in certain embodiments. In a variety of embodiments, a mobile device is capable of capturing and/or generating any of the data obtained by a telematics device without a connection to the telematics device.

In some examples, telematics, sensor data, and/or other data (e.g., error or issue codes associated with maintenance of a vehicle) can be transmitted (e.g., to roadside assistance server) and can be used to further aid in identifying an issue or type of issue a vehicle can be having.

Vehicle 310 can further include a short-range communication system 316. The short-range communication systems 316 can be vehicle-based data transmission systems configured to transmit vehicle operational data to other nearby vehicles, and to receive vehicle operational data from other nearby vehicles. In some examples, communication system 316 can use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system 316 need not use DSRC, and can be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication system 316 can be sent via DSRC, Bluetooth, satellite, GSM infrared, IEEE 802.11, WiMAX, RFID, and/or any suitable wireless communication media, standards, and protocols. In certain systems, short-range communication system 316 can include specialized hardware installed in vehicles 310 (e.g., transceivers, antennas, etc.), while in other examples the communication system 316 can be implemented using existing vehicle hardware components (e.g., radio and satellite equipment, navigation computers) or can be implemented by software running on the mobile device 330 of drivers and passengers within the vehicle 310. The range of V2V communications can depend on the wireless communication standards and protocols used, the transmission/reception hardware (e.g., transceivers, power sources, antennas), and other factors. Short-range V2V communications can range from just a few feet to many miles, and different types of driving behaviors, vehicle operational parameters, and the like, can be determined depending on the range of the V2V communications.

V2V communications also can include vehicle-to-infrastructure (V2I) communications, such as transmissions to or from vehicles to or from non-vehicle receiving devices, such as infrastructure. Infrastructure can include one or more of toll booths, rail road crossings, parking garages, road segments, parking lots, buildings or other structures, and/or road-side traffic monitoring devices which can include one or more sensors for detecting environmental conditions (e.g., weather, lighting, etc.) as well as parking availability. Certain V2V communication systems can periodically broadcast data from a vehicle 310 to any other vehicle or other infrastructure device capable of receiving the communication within the range of the vehicle's transmission capabilities. For example, a vehicle 310 can periodically broadcast (e.g., every 0.1 second, every 0.5 seconds, every second, every 5 seconds, dynamically, etc.) certain vehicle operation data via its short-range communication system 316, regardless of whether or not any other vehicles or reception devices are in range. In other examples, a vehicle communication system 316 can first detect nearby vehicles and receiving devices, and can initialize communication with each by performing a handshaking transaction before beginning to transmit its vehicle operation data to the other vehicles and/or devices. Broadcasts from infrastructure can also have varying ranges and, in some examples, infrastructure can broadcast to an intermediate station which can then relay the information to the roadside assistance server 350 (or other device).

The types of vehicle operational data, vehicle driving data, breakdown issue data, or the like, transmitted to or from vehicle 310 and/or infrastructure can depend on the protocols and standards used for the V2V or V2I communication, the range of communications, and other factors. In certain examples, vehicle 310 can periodically broadcast corresponding sets of similar vehicle driving data, such as the location (which can include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) can use internal clocks with synchronized time signals and can send transmission times within V2V (or V2I) communications so that the receiver can calculate its distance from the transmitting node based on the difference between the transmission time and the reception time. The state or usage of the vehicle's controls and instruments can also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also can be transmitted in V2V (or V2I) communications.

In various other examples, any data collected by any vehicle sensors 311 potentially can be transmitted via V2V or V2I communication to other nearby vehicles or infrastructure devices receiving V2V or V2I communications from communication system 316. Further, additional vehicle driving data not from the vehicle's sensors (e.g., vehicle make/model/year information, driver insurance information, driving route information, vehicle maintenance information, driver scores, etc.) can be collected from other data sources, such as mobile device 330, and transmitted using V2V or V2I communications to nearby vehicles and other receiving devices using communication system 316.

The system 300 in FIG. 3 also includes a mobile device 330. Mobile device 330 can be, for example, a smartphone or other mobile phone, personal digital assistant (PDAs), tablet computer, and the like, and can include some or all of the elements described herein. Specifically, it should be noted that some or all of the functionality described with respect to vehicle 310 and/or roadside assistance server 350 can be implemented using mobile device 330. Some mobile devices in systems 300 (e.g., mobile device 330) can be configured to establish communication sessions with vehicle-based devices and various internal components of vehicle 310 via wireless networks or wired connections (e.g., for docked devices), whereby such mobile devices 330 can have secure access to internal vehicle sensors 311 and other vehicle-based systems. However, in other examples, the mobile device 330 might not connect to vehicle-based computing devices and internal components, but can operate independently by communicating with vehicle 310 via their standard communication interfaces (e.g., telematics device 313, etc.), or might not connect at all to vehicle 310.

Mobile device 330 can include a network interface 332, which can include various network interface hardware (e.g., adapters, modems, wireless transceivers, etc.) and software components to enable mobile device 330 to communicate with roadside assistance server 350, vehicle 310, and various other external computing devices. One or more specialized software applications, such as a roadside assistance application 334, can be stored in the memory of the mobile device 330. The roadside assistance application 334 can be received (e.g., downloaded or otherwise provided) via network interface 332 from the roadside assistance server 350, vehicle 310, or other application providers (e.g., application stores). As discussed below, the roadside assistance application 334 can include various user interface screens, and can be configured to run as user-initiated applications or as background applications. The memory of the mobile device 330 also can include databases configured to receive and store vehicle data, driving data, driving trip data, and the like, associated with one or more drivers, vehicles, and the like.

Mobile device 330 can include various components configured to generate and/or receive vehicle data, driver data, and driving data or other operational data, as well as communicate with other devices within the system 300. As discussed herein, the roadside assistance software application 334 can store and analyze the data from various mobile device components, historical data, and the like, and can use this data, in conjunction with one or more other devices (e.g., roadside assistance server 350), to identify a location of a vehicle, determine operational parameters of a vehicle, identify a potential issue or type of issue, generate, transmit or receive notifications, and the like. Mobile computing device 330 can store, analyze, and/or transmit the data to one or more other devices. For example, mobile computing device 330 can transmit data directly to one or more roadside assistance servers 350. As discussed above, the roadside assistance server 350 can determine a location of the vehicle being evaluated, control data collected or received and processed by the system, determine operational parameters of the vehicle, identify one or more issues or types of issues, and generate and transmit notifications. In some examples, one or more of these functions can be performed by the processing components of the mobile device (e.g., via roadside assistance application 334). Therefore, in certain arrangements, mobile computing device 330 can be used in conjunction with, or in place of, the roadside assistance server 350.

Vehicle 310 can include roadside assistance system 314, which can be a separate computing device or can be integrated into one or more other components within the vehicle 310, such as the telematics device 313, autonomous driving systems, or the internal computing systems of vehicle 310. As discussed above, roadside assistance analysis computer 314 also can be implemented by computing devices independent from the vehicle 310, such as mobile device 330 of the drivers or passengers, or one or more separate computer systems (e.g., a user's home or office computer). In any of these examples, the roadside assistance system 314 can contain some or all of the hardware/software components of various devices and systems described herein. Further, in certain implementations, the functionality of the roadside assistance system, such as storing and analyzing driver data, vehicle data, location data, and the like, can be performed in a roadside assistance server 350 rather than by the individual vehicle 310 or mobile device 330. In such implementations, the vehicle 310 and and/or mobile device 330, might only collect and transmit driver data, sensor data, location data, vehicle operational data, and the like to roadside assistance server 350, and thus the vehicle-based roadside assistance system 314 can be optional.

The system 300 also can include one or more roadside assistance servers 350, containing some or all of the hardware/software components described herein. The roadside assistance server 350 can include hardware, software, and network components to receive data (e.g., signals or other electronic transmissions) related to location, operational data, and the like, process the data, control an amount or type of data collected by sensors and/or transmitted for processing or analysis, identify an issue or type of issue associated with a vehicle, generate and transmit notifications, and the like, from one or more of vehicle 310, mobile device 330, and other data sources. The roadside assistance server 350 can include a roadside assistance database 352 and roadside assistance server application 351 to respectively store and analyze driver data, vehicle data, sensor data, etc., received from vehicle 310, mobile device 330, and/or other data sources. In some examples, the roadside assistance server 351 can include many or all of the components of the roadside assistance computing platform 210 described with respect to FIG. 2.

In some examples, some data can be received by the roadside assistance server 350 from vehicle 310 wirelessly via telematics device 313. Additionally, the roadside assistance server 350 can receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., coverage amount, deductible amount, premium amount, insured status) for the vehicle, driver, and/or other nearby vehicles and drivers, and the like.

Data stored in the roadside assistance database 352 can be organized in any of several different manners. For example, a roadside assistance table can contain data related to previous roadside assistance issues, vehicle features (e.g., organized by make, model, year, etc.), special equipment needs for particular vehicles, images of roadside assistance issues, etc. Other tables in the database 352 can store additional data, including data types discussed above (e.g. traffic information, road-type and road condition information, weather data, insurance policy data, etc.). Additionally, one or more other databases of other insurance providers containing additional driver data and vehicle data can be accessed to retrieve such additional data. In a variety of embodiments, this data can include a risk map including data associated with one or more of vehicle accident data, traffic data, vehicle volume data, vehicle density data, road characteristic data, or weather data for a variety of geographical locations. Systems and methods for generating and utilizing risk maps that can be utilized in accordance with embodiments of the invention are disclosed in U.S. Pat. No. 9,581,461, titled "Data Processing System Communicating with a Map Data Processing System to Generate a Display of One or More Segments of One or More Vehicle Routes" and issued Feb. 28, 2017, the disclosure of which is hereby incorporated by reference in its entirety.

The roadside assistance server application 351 within the roadside assistance server 350 can direct the roadside assistance server 350 to retrieve data from the database 352, or can receive data directly from mobile device 330, or other data sources, and can perform one or more analyses to evaluate the data received, determine a location of the vehicle, determine whether the vehicle has stopped, control an amount or type of data collected or transmitted for processing, identify an issue or type of issue, generate and transmit notifications, and other related functions. The functions performed by the roadside assistance server application 350 can be performed by specialized hardware and/or software separate from the additional functionality of the roadside assistance server 350. Such functions and further descriptions and examples of the algorithms, functions, and analyses that can be executed by the roadside assistance server 350 are described herein.

In various examples, the roadside assistance analyses, identifications, and determinations can be performed entirely in the roadside assistance server 350, can be performed entirely in the vehicle-based roadside assistance analysis computing module 314, or can be performed entirely by the mobile device 330. In other examples, certain analyses of data, and the like, can be performed by vehicle-based devices (e.g., within roadside assistance analysis device 314) or mobile device 330 (e.g., within application 334), while other data analyses are performed by the roadside assistance server 350. Various other combinations of devices processing data can be used without departing from the invention.

Roadside Assistance Processes

As discussed herein, the systems, arrangements, methods and the like, described herein provide an efficient and accurate system for monitoring vehicles to detect issues that have caused the vehicle to stop. In some arrangements, the system can receive and/or process data in real-time in order to effectively and accurately identify vehicles that are stopped, determine a reason for stopping, and the like. Vehicles can experience pauses in trips for a variety of reasons, including being stopped at a stoplight, being slowed due to traffic, mechanical issues with the vehicle, and the like. When a vehicle is experiencing mechanical issues, roadside assistance requests can be automatically initiated. However, it is not desirable to initiate roadside assistance requests when a vehicle is not experiencing mechanical issues during a pause in the trip. Roadside assistance processes as described herein can determine when a vehicle is paused during a trip and determine the likelihood that the vehicle is experiencing a breakdown or has another need for roadside assistance during the trip pause.

Figure 4A:
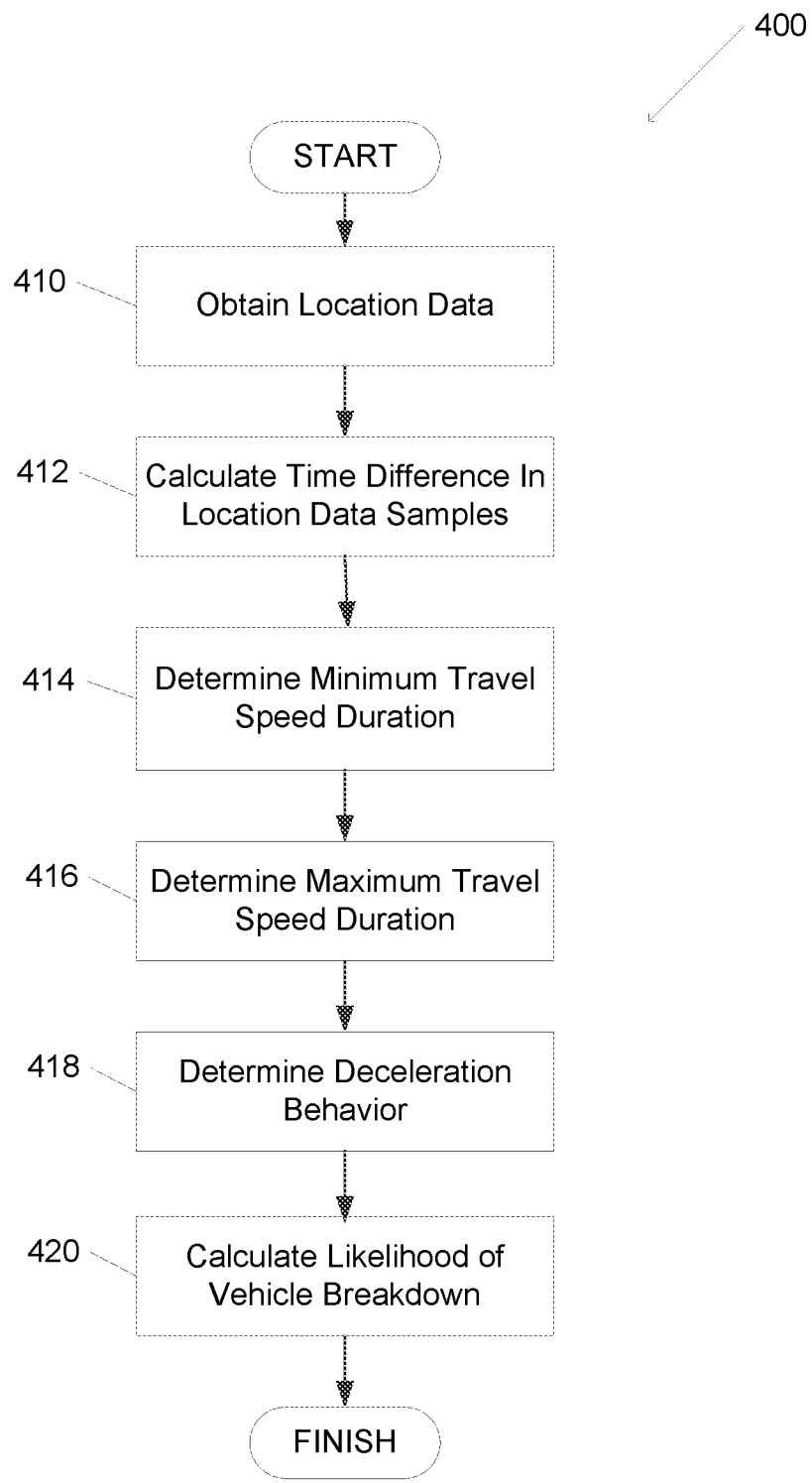
FIG. 4A is a flowchart illustrating a process for determining a vehicle breakdown in accordance with one or more aspects described herein.

Turning now to FIG. 4A, a process for determining a likelihood that a vehicle is experiencing a breakdown or other need for roadside assistance during a trip pause in accordance with an aspect of the disclosure is shown. Some or all of the steps of process 400 may be performed using one or more computing devices as described herein. In a variety of embodiments, some or all of the steps described below may be combined and/or divided into sub-steps as appropriate.

At step 410, location data can be obtained. The location data can include any of a variety of data that indicates the geographic location of the vehicle. For example, the location data can include global positioning system (GPS) coordinates, a location determined based on cellular tower triangulation, location determined in a V2V and/or V2I system, and the like. The location data can be obtained from an in-vehicle location determination device, such as from a GPS receiver installed in the vehicle and/or location data obtained from a vehicle data bus, and/or from a mobile device associated with the vehicle. For example, a mobile device associated with the driver of the vehicle can be utilized to determine the location of the vehicle. The location data can be obtained from a telematics device installed in a vehicle and/or a mobile device associated with a vehicle by any of a variety of computing devices as described herein.

In a variety of embodiments, the location data may be provided in a variety of different formats and/or with different levels of accuracy depending on the specific device obtaining and providing the location data. The location data can be processed into a standardized format to facilitate the coordination of location and/or speed measurements of a variety of devices. The location data can include coordinates (e.g. a latitude and/or longitude) that identify the location of the vehicle and/or mobile device. In many embodiments, the location data can be enriched with a variety of metadata. This metadata can include, but is not limited to, a unique identifier for the message, an identifier of the vehicle and/or mobile device, a group identifier, a timestamp indicating when the location data was captured, a trip identifier, a timestamp captured from signals provided by a GPS (or other location service) satellite, the speed at which the device is moving at the time the location data was captured, the acceleration of the device at the time the location data was captured, an accuracy indicator indicating the accuracy of the horizontal and/or vertical coordinates, a heading vector, a route identifier indicating what route (e.g. road) the device is currently traveling, a speed limit of the current route, a congested indicator indicating if the current route is congested, and the like. In several embodiments, the speed of the vehicle can be determined based on the Doppler shift of signals received by the GPS receiver relative to a known frequency for the received signals (e.g. the signals transmitted by the GPS satellites).

At step 412, a time difference in location data samples can be calculated. The obtained location data can include multiple location data samples taken at different times. For example, a location determination device, such as a GPS receiver, can determine the location of the vehicle every five seconds, although any sampling rate can be used as appropriate. The time stamps for each location data sample can be compared to determine the time difference between location data samples.

The travel speed of the vehicle can be determined based on the location data samples, such as by calculating the distance between the geographic location at two location data samples and determining the travel speed of the vehicle based on the time between the location data samples. In several embodiments, the location data includes speed data sampled at various points in time using a speed determination device, such as an accelerometer and/or a GPS receiver. The travel speed of the vehicle can be determined during the time frame identified by the location data and the minimum speed and maximum speed of the vehicle can be calculated.

At step 414, a minimum travel speed duration can be determined. In several embodiments, the minimum travel speed is indicated in at least one of the location data samples. In a variety of embodiments, for each received location data sample, the maximum speed can be calculated for a particular duration, such as 30 seconds. If this value is less than or equal to a threshold speed for a low speed threshold, the vehicle can be indicated as traveling at a low speed. The distance traveled by the vehicle at the minimum travel speed can also be calculated. In many embodiments, the Haversine distance traveled by the vehicle for the particular duration can be calculated for each location data sample. If this value is less than or equal to a threshold distance for traveling at a low speed, the vehicle can be indicated as in a trip pause.

A trip pause can be indicated by a vehicle traveling less than a threshold speed for a threshold distance and/or time. For example, a vehicle may experience a trip pause when stopped at a stop light. In another example, a vehicle may experience a trip pause when stopped on a highway. The highway stoppage can be due to traffic and/or a mechanical breakdown of the vehicle. The threshold speed can be determined based on the road on which the vehicle is traveling. For example, if the vehicle is traveling at 5 MPH on a highway with a speed limit of 75 MPH, the vehicle may be experiencing mechanical issues that prevent the vehicle from traveling at safe highway speeds. If the value is greater than the threshold distance, the vehicle can be indicated to be in a congested area. The change in altitude of the vehicle can also be considered when determining distance traveled. For each location data sample, the altitude change over the particular duration can be calculated as the absolute value of the difference between the last location data sample and the first location data sample in the duration. If this value is greater than or equal to an altitude threshold, the vehicle can be indicated as being in a congested area. Similarly, if the value is less than the altitude threshold, the vehicle can be indicated to be in a trip pause.

At step 416, a maximum travel speed duration can be determined. The maximum travel speed duration can be determined based on one or more location data samples over a particular duration. For each received location data sample, the minimum speed within the particular duration can be determined. If the minimum speed exceeds a high speed threshold, the vehicle can be indicated as traveling at a high speed.

At step 418, deceleration behavior data can be determined. The deceleration behavior data can include determining if the minimum speed of the vehicle fell below a minimum speed threshold and/or if the maximum speed of the vehicle exceeded a maximum speed threshold for a specific time period. If the vehicle moved from a high speed of travel to a low speed of travel, the time taken by the vehicle to decelerate can be calculated. The deceleration time can include determining the last location data sample at which the vehicle was traveling at a high rate of speed, the first location data sample at which the vehicle was traveling at a low rate of speed, and calculating the time between the last location data sample and the first location data sample. Any other driving behaviors, such as turns, sharp turns, excessive braking, and the like, can also be determined based on the location data.

Figure 4B:
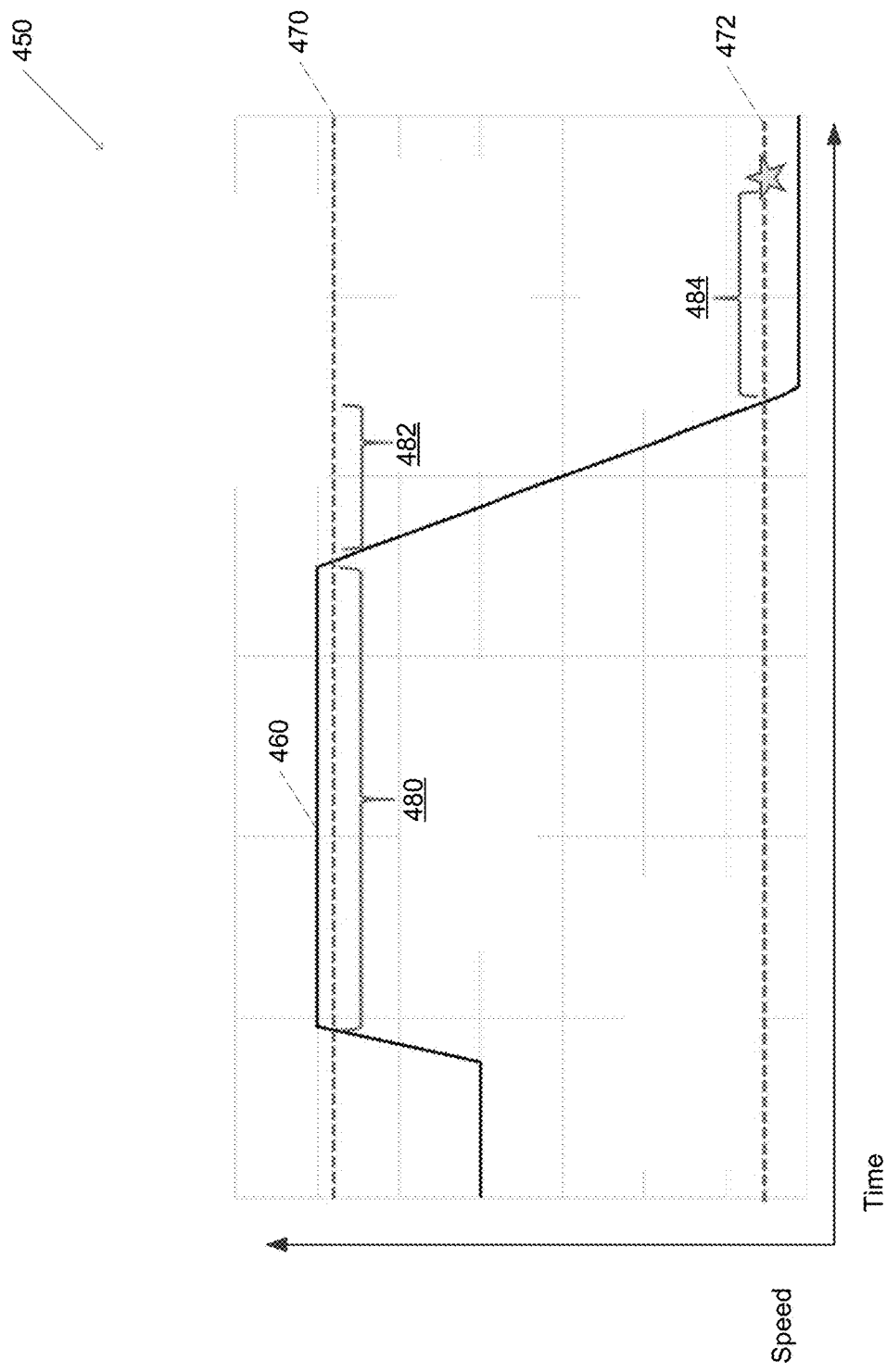
FIG. 4B is a conceptual illustration of driving intervals used in determining a trip pause in accordance with one or more aspects described herein.

FIG. 4B is a conceptual illustration of driving intervals used in determining a trip pause in accordance with one or more aspects described herein. The driving interval 450 includes a vehicle speed over time signal 460, a high speed threshold 470, a low speed threshold 472, a time above high speed interval 480, a deceleration interval 482, and a time below low speed interval 484. The high speed threshold 470 can be a threshold speed that indicates when a vehicle is traveling at a high rate of speed. The high speed threshold 470 can be determined based on the type of road on which the vehicle is traveling, the speed limit of the road, the speed of other vehicles in proximity to the vehicle, and the like. The low speed threshold 472 can be a threshold speed that indicates when a vehicle is traveling at a low rate of speed. The low speed threshold 472 can be determined based on the type of road on which the vehicle is traveling, the speed limit of the road, the speed of other vehicles in proximity to the vehicle, and the like. The vehicle speed over time signal 460 can indicate the speed of the vehicle over time. The high speed interval 480 can indicate a time period in which the vehicle was traveling at a speed above the high speed threshold 470. The low speed interval 484 can indicate a time period in which the vehicle was traveling at a speed below the low speed threshold 472. The deceleration interval 482 can indicate the amount of time and/or the rate of deceleration of the vehicle when the vehicle slows from the rate of travel above the high speed threshold to the rate of travel below the low speed threshold.

At step 420, a likelihood of a vehicle breakdown or other need for roadside assistance can be calculated. The likelihood of a vehicle breakdown can be determined based on the vehicle being in a trip pause. The likelihood of a vehicle breakdown can be calculated based on the time that the vehicle is traveling at a low rate of speed. The longer that a vehicle is moving slowly (or not at all), the more likely that the vehicle is in a trip pause. However, if the vehicle is located in a congested area where all vehicles are moving slowly, the vehicle may not be experiencing a vehicle breakdown. The likelihood of a vehicle breakdown can be determined based on the minimum speed of the vehicle and/or the maximum speed of a vehicle. In a variety of embodiments, a traffic congestion map can be used to determine the speed of other vehicles in the same geographic region at the same time indicated in the location data. For example, if the vehicle is stopped on a highway, but every other car was also stopped on the highway at the same time, it is more likely that the vehicle was stopped or slowed due to traffic conditions and not due to a roadside emergency. In another example, if the vehicle is stopped on a highway, but every other car was traveling at a high rate of speed on the highway at the same time, it is likely that the vehicle was stopped or slowed due to a roadside emergency. Techniques for determining a traffic congestion map that can be utilized in accordance with aspects of the disclosure are described in more detail with respect to FIG. 5A.

Machine classifiers can be used to generate feature vectors classifying the status of a vehicle along with a probability indicating the confidence in the classified status. The status of the vehicle can be indicated using any label, such as normal operation, trip pause, experiencing a roadside event, and the like. The classification of the vehicle status may be verified based on feedback obtained based on a notification generated and/or transmitted as described herein. The machine classifiers may be trained using a set of training data comprising a set of labels indicating roadside events and a mapping of the labels to a set of locations, contextual location data, and/or device motion data. A variety of machine classifiers may be used to calculate future processing time performance including, but not limited to, decision trees, k-nearest neighbors, support vector machines (SVM), neural networks (NN), recurrent neural networks (RNN), convolutional neural networks (CNN), and/or probabilistic neural networks (PNN). RNNs may further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers may be utilized, more specific machine classifiers when available, and general machine classifiers at other times may further increase the accuracy of predictions. Aspects described herein may be used with any type of neural network structure, and for any suitable application, particularly where a maximum likelihood objective is used during training. In many embodiments, the additional information can be used to determine ground truth labels for training data generated based on the detected stoppages. The training data can be used to train a variety of machine classifiers to detect trip pauses and/or vehicle breakdowns as described herein.

Traffic congestions maps can be generated based on data obtained from a variety of vehicles and/or mobile devices and can describe traffic conditions at various times and various geographic locations. Traffic congestion maps can be used to determine if a stoppage of a vehicle during a trip is related to overall traffic conditions and/or related to potential issues with the vehicle that could require roadside assistance.

Figure 5A:
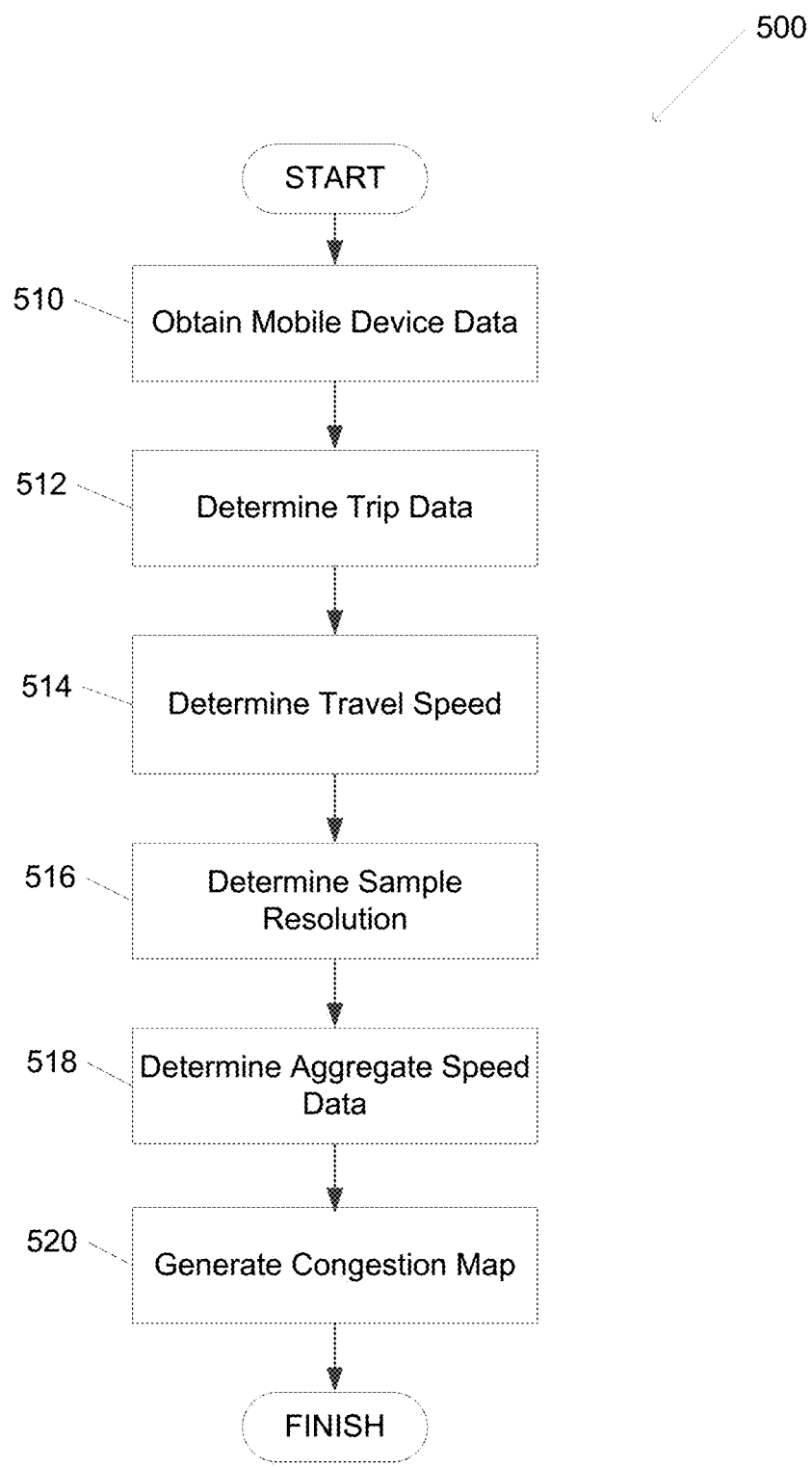
FIG. 5A is a flowchart illustrating a process for generating a congestion map in accordance with one or more aspects described herein.

FIG. 5A is a flowchart illustrating a process for generating a congestion map in accordance with one or more aspects described herein. Some or all of the steps of process 500 may be performed using one or more computing devices as described herein. In a variety of embodiments, some or all of the steps described below may be combined and/or divided into sub-steps as appropriate.

At step 510, mobile device data can be obtained. The mobile device data can include one or more location data samples for one or more vehicles. The location data samples can include any of the data and/or metadata described herein. In several embodiments, the mobile device data includes location data samples for one or more trips taken by the vehicle associated with the mobile device data over a particular time period, such as one day. However, any time period can be used as appropriate. The mobile device data can be generated using a mobile device associated with a vehicle. However, it should be noted that the mobile device data can be generated by any computing device, such as an on-board computer and/or a telematics device, that captures location data samples for a vehicle. The mobile device data can be transmitted to a remote computing device for processing and/or processed using the mobile device as appropriate.

At step 512, trip data can be determined. Trip data can include a set of location data samples for each of the vehicles identified in the mobile device data. A trip can be defined as a path taken by a vehicle having a starting point and an ending point. The trip start indicates the first location data sample where the vehicle begins moving, such as after having been parked in a garage. The trip end indicates the last location data sample where the vehicle has reached its destination and stopped. The path of the vehicle can be determined based on the geographic locations (e.g. latitude and longitude coordinates generated using a GPS receiver) indicated in the location data samples. In a number of embodiments, the geographic locations can be mapped to known roads (or other paths) that can be used to automatically map the geographic locations to known locations in the road. In many embodiments, a class of road on which the vehicles are traveling can be determined. The class of road can be used to identify roads or road types where roadside events cannot be distinguished from normal trip pauses, such as parking lots and/or other off-road locations. In a variety of embodiments, location data samples associated with road classes that cannot be distinguished can be filtered from the location data samples in order to improve the accuracy of the generated congestion map.

At step 514, travel speed can be determined. Travel speed can be determined over particular time periods (1 hour, 30 minutes, 15 mins, etc.). The travel speed can be determined for the vehicle on a per-trip basis. In many embodiments, the travel speed can be determined for a specific time period and/or a specific region within the trip. The travel speed can be indicated in the location data samples and/or calculated based on the differences in location and time between adjacent location data samples as appropriate. That is, the location data samples can be ordered by time and/or geographic location to identify the path traveled by the vehicle. Adjacent location data samples can be identified as being the previous and/or next location data sampled in the ordered list of location data samples.

At step 516, a sample resolution can be determined. A sample resolution can indicate the desired accuracy at which an aggregate travel speed for a particular location at a particular time can be calculated. The location and/or time can be determined based on a location at which a vehicle is potentially in a roadside assistance situation due to the vehicle being in a trip pause. The sample resolution can be specified in a particular time period, such as 24 hours, 8 hours, 4 hours, 1 hour, 30 minutes, 15 minutes, and/or any other time period as appropriate. The sample resolution can be used to select location data samples for a particular trip in the specified time frame.

At step 518, aggregate speed data can be determined. The aggregate speed data can indicate the typical speed of travel for vehicles along a particular route (e.g. trip, road, and the like) at a particular time. Aggregate speed data can be determined for a location and/or time based on the trip data for multiple mobile devices. The aggregate speed data can be calculated based on the location data samples for the location (and/or region) falling within the sample resolution of the indicated time. For example, if a vehicle is in a trip pause at 9:17 am on a Thursday and the sample resolution is 30 minutes, the location data samples having a trip corresponding to the vehicle and captured between 9:02 am and 9:32 am can be used to determine the aggregate speed. The aggregate speed can be calculated according to a variety of metrics, such as average speed of all vehicles on a trip on the indicated road (e.g. path indicated in the trip data) at the specified time, the median speed of all vehicles on a trip at the specified time, the geometric mean speed of all vehicles on a trip at the specified time, and the like.

Figure 5B:
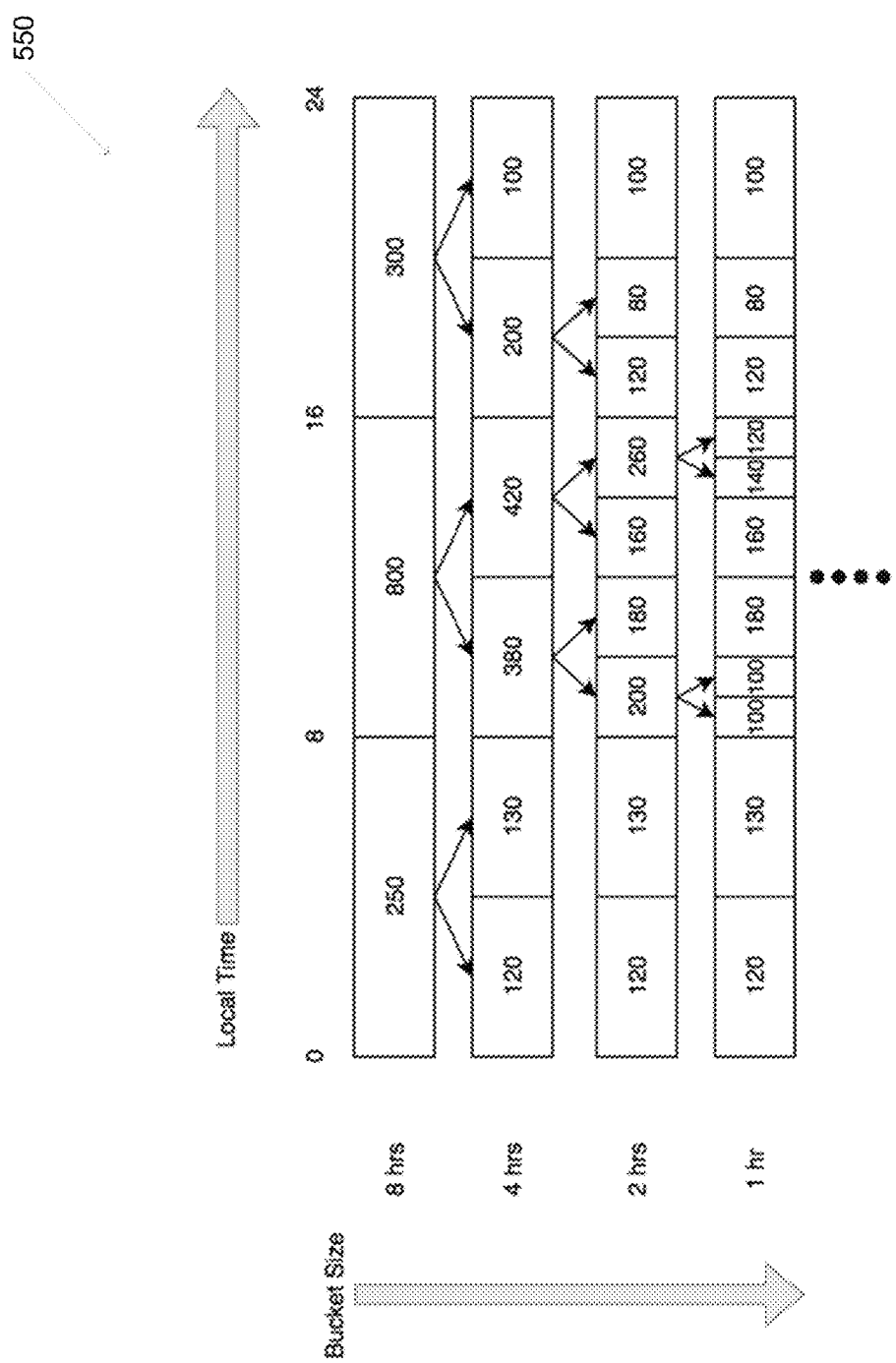
FIG. 5B is a conceptual illustration of a time-dependent sampling of location data samples in accordance with one or more aspects described herein.

FIG. 5B is a conceptual illustration of a time-dependent sampling of location data samples in accordance with one or more aspects described herein. The time-dependent sampling 550 includes 1,350 location data samples that can be grouped according to the time at which the location data sample was measured. The time-dependent sampling 550 includes location data samples taken over a 24 hour period. These location data samples can be grouped into buckets of different time periods, such as eight hours, four hours, two hours, and one hour. However, it should be noted that any number of buckets and any time period can be used as appropriate. For example, there are 250 samples between hours 0 and 8 in time-dependent sampling 550, where 120 of those samples occurred between 0 and 4 hours and 130 of those samples occur during 4 and 8 hours. A particular bucket of samples can be selected based on a desired accuracy and/or time period for determining an aggregate speed. For example, if the aggregate speed of a particular road is desired over a 24 hour period, all 1350 location data samples can be analyzed. However, if the aggregate speed of the road is desired over a 1 hour period between hours 8 and 9, only those 100 samples occurring between hours 8 and 9 can be selected. Similarly, if the aggregate speed is desired over a 15 minute time period between 2 pm and 2:15 pm, only those location data samples in the 15-minute bucket for 2 pm and 2:15 pm can be selected for analysis. In this way, the aggregate speed for a particular road can be calculated based on the relevant samples, thereby avoiding unnecessary calculations. This improves both the functioning of a computing device to calculate speed data and the accuracy of the calculated data as only relevant samples are selected.

At step 520, a congestion map can be generated. The congestion map can include the aggregate speed data for the roads and/or locations indicated in the trip data over a particular time period. For example, the congestion map can indicate that the average rate of travel for a vehicle on a particular road was 45 MPH at 11 am on a Tuesday and 12 MPH at 8:30 am on a Thursday. The congestion map can also include bounding areas along the road that indicate the rate of travel over distinct portions of the road. For example, the congestion map can indicate curves, hills, overpasses, and other road features that are commonly associated with slowdowns in the rate of travel for vehicles on the road. The bounding areas can be identified based on a variety of data, such as geographic coordinates and/or relative distances from other bounding areas and/or road features.

Trip pauses can be based on location data associated with a vehicle. The location data can be used to determine the location and/or speed of the vehicle and correlated with traffic patterns described in a traffic congestion map for the geographic location to determine if the vehicle is paused or stopped based on traffic conditions and/or other conditions that may indicate a need for roadside assistance. In a variety of embodiments, if the probability that the trip pause is due to a roadside emergency exceeds a threshold value, a roadside assistance request can be initiated.

Figure 6:
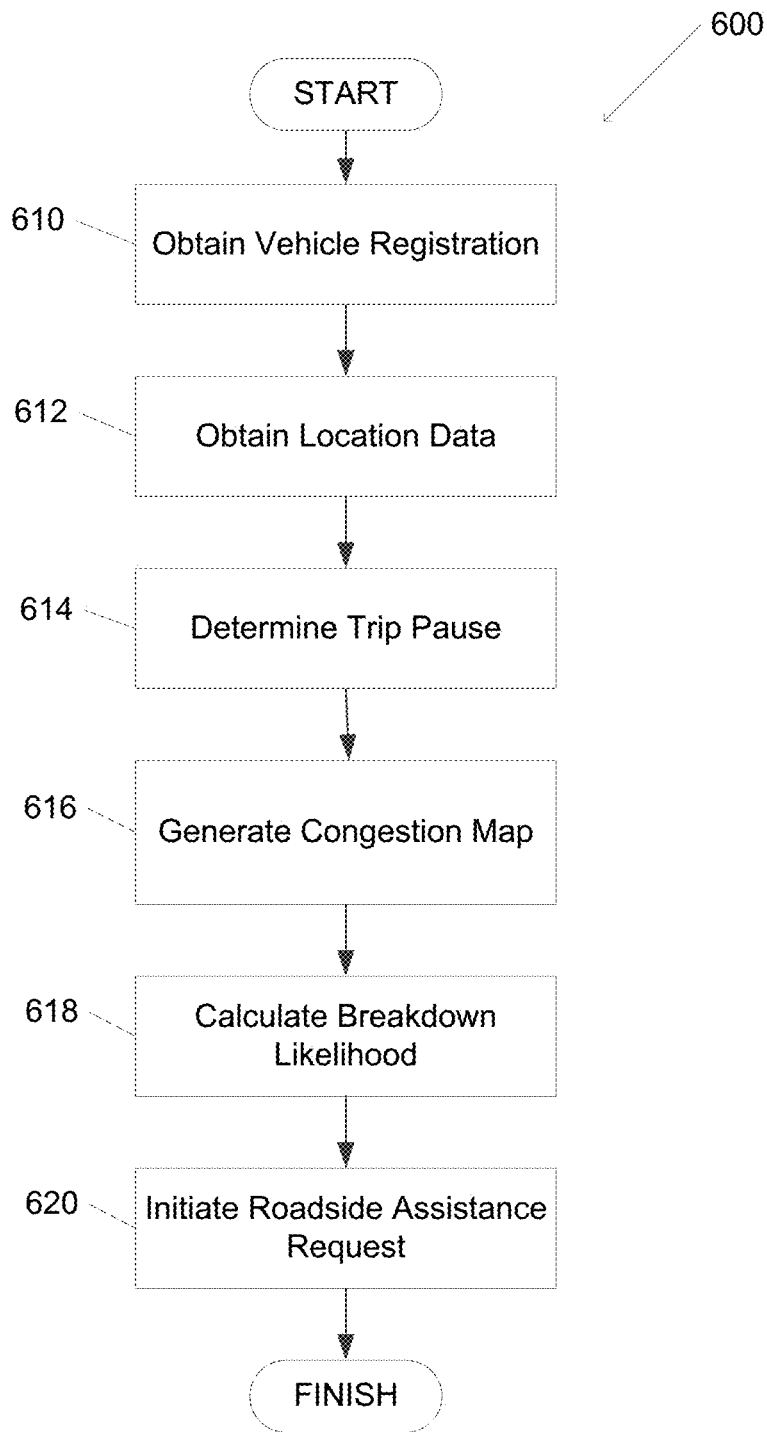
FIG. 6 is a flowchart illustrating a process for initiating a roadside assistance request in accordance with one or more aspects described herein.

FIG. 6 is a flowchart illustrating a process for initiating a roadside assistance request in accordance with one or more aspects described herein. Some or all of the steps of process 600 may be performed using one or more computing devices as described herein. In a variety of embodiments, some or all of the steps described below may be combined and/or divided into sub-steps as appropriate.

At step 610, a vehicle registration can be obtained. A user can register their vehicle in order to engage the monitoring aspect of the system. Registration can be performed via an online or mobile application executing one or more computing devices. Registration can include a user providing information about the vehicle (e.g., make, model, year, etc.), potential drivers (e.g., name, contact information, and the like), and the like. In some examples, the registration process can also include options for initiating the processes or systems described herein. For example, the registration process can include an option for "always on" which means the system can monitor the vehicle at all times to detect when the vehicle is on a highway, etc. In other examples, the user can select to have the system activate or initiate upon detecting a speed of the vehicle above a predetermined threshold (e.g., greater than 40 MPH, 50 MPH, 60 MPH, or the like, for a predetermined time). In another example, the system can activate or initiate upon a vehicle location being detected as on a highway or upon navigation information indicating that a user will be using a highway along a predetermined route. In still another example, a user can manually activate the system when approaching or planning to drive on a highway (e.g., via an online or mobile application). Various other arrangements for activating or initiating the system can be used without departing from the invention.

At step 612, location data can be obtained. The location data can indicate where a vehicle has stopped. A variety of techniques for obtaining location data are described herein. At step 614, a trip pause can be determined. A variety of techniques for determining a trip pause are described with respect to FIGS. 4A-B. At step 616, a congestion map can be generated. A variety of techniques for generating a congestion map are described with respect to FIGS. 5A-B.

At step 618, a breakdown likelihood can be calculated. A likelihood of a breakdown can be based on the location in which the vehicle pauses its trip, the rate of speed at which the vehicle slowed, and/or the speed of other vehicles traveling on the road as indicated in the congestion map. The breakdown likelihood can include a probability calculated based on the location of the vehicle and/or the speed at which other vehicles are travelling. For example, if a vehicle is stopped in a parking lot with few vehicles moving by, the vehicle is likely not experiencing a roadside event. In another example, if a vehicle is traveling slowly on a road with a high speed limit, such as a highway, and other vehicles are traveling much faster than the vehicle, such as having a speed difference over a threshold value, the vehicle is likely experiencing a roadside event even if the vehicle has not fully stopped. In a variety of embodiments, a machine classifier can be used to generate feature vectors classifying the status of a vehicle along with a probability indicating the confidence in the classified status. The status of the vehicle can be indicated using any label, such as normal operation, in a trip pause, experiencing a roadside event, and the like. The classification of the vehicle status may be verified based on feedback obtained based on a notification generated and/or transmitted as described herein.

At step 620, a roadside assistance request can be initiated. A roadside assistance request can be initiated when the breakdown likelihood exceeds a threshold probability, such as 75%. Initiating a roadside assistance request can include transmitting a notification (or any other interaction) to be provided by one or more computing devices associated with the vehicle. These notifications may request confirmation of whether there was a roadside incident experienced by the vehicle. If the vehicle is experiencing a roadside event, additional information can be obtained regarding the incident. If the vehicle is not experiencing a roadside event, additional information can be obtained to determine what factors caused the false positive. A variety of systems and methods for providing roadside assistance recommendations and notifications are described in U.S. patent application Ser. No. 16/152,739, filed Oct. 5, 2018, and U.S. patent application Ser. No. 16/426,663, filed May 30, 2019, the disclosures of which are hereby incorporated by reference in their entirety.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied, in whole or in part, in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product. Those aspects can take the form of an entirely hardware embodiment, an entirely software embodiment, or an embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
    obtaining, using a computing device, location data for a vehicle;
    determining, using the computing device which compares a vehicle speed to a threshold speed, that the vehicle speed is below the threshold speed for a time period;
    generating, using the computing device, a congestion map;
    obtaining, from the congestion map and using the computing device, an aggregate vehicle speed for a plurality of other vehicles;
    using the computing device to determine that a type of road travelled by the vehicle is a highway;
    increasing, responsive to the type of road being the highway and further responsive to a determination of a change from a non-highway road to the highway, a data collection rate for one or more sensors of the vehicle, wherein the data collection rate for the one or more sensors of the vehicle is increased, at least temporarily, each time there is a determination of a change from any non-highway road to any highway;
    calculating, using the computing device, based on determining the vehicle speed is below the threshold speed, and based on the aggregate vehicle speed, a probability that the vehicle is in a trip pause;
    establishing communication, using a wireless network, between the computing device and a mobile device associated with the vehicle;

transmitting, from the computing device to the mobile device, and based on the probability that the vehicle is in the trip pause, a request to initiate roadside assistance for the vehicle; and causing the request to initiate roadside assistance to be displayed at a display of the mobile device.

2. The method of claim 1, wherein the computing device comprises a telematics device installed in the vehicle.

3. The method of claim 1, wherein:
the location data comprises a geographic location of the vehicle and a speed of the vehicle when the location data was generated; and
determining that the vehicle is traveling below the threshold speed is further based on the speed indicated in the location data.

4. The method of claim 3, wherein the geographic location and the speed of the vehicle are determined using a global positioning system receiver.

5. The method of claim 4, further comprising determining the speed of the vehicle by calculating a rate of travel of the global positioning system receiver by calculating a Doppler shift of signals received by the global positioning system receiver relative to a known frequency for the received signals.

6. The method of claim 1, further comprising obtaining the aggregate vehicle speed from the congestion map generated by:
obtaining, by the computing device, a plurality of location data samples, wherein a location data sample of the plurality of location data samples comprises a time stamp indicating when the location data sample was captured, a geographic location at which the location data sample was taken, and a speed;
determining, by the computing device, a sample resolution indicating a time period;
selecting, by the computing device, a subset of the plurality of location data samples based on the sample resolution, wherein each location data sample in the selected subset has a time stamp occurring within the time period;
determining, by the computing device, an aggregate speed based on the speed indicated in each location data sample in the subset of the plurality of location data samples; and
generating, by the computing device, the congestion map based on the geographic location and the aggregate speed for the geographic location.

7. The method of claim 6, wherein the plurality of location data samples are obtained from the plurality of other vehicles.

8. The method of claim 1, wherein causing the request to initiate roadside assistance to be displayed includes displaying a request to confirm whether the vehicle experienced a roadside incident.

9. The method of claim 1, wherein the congestion map is generated to indicate:
an average speed for a particular road corresponding to a time period; and
a bounding area over a portion of the particular road.

10. The method of claim 1, further comprising initiating registration, for the computing device, with a roadside assistance system in response to detecting that the vehicle speed is greater than a predetermined threshold speed.

11. A computing device, comprising:
a processor; and
a memory in communication with the processor, the memory including instructions that, when executed by the processor, cause the computing device to:
obtain location data for a vehicle from a global positioning system (GPS) receiver, the location data comprising a geographic location of the vehicle and a speed of the vehicle when the location data was generated;
determine that the speed of the vehicle is below a threshold speed;
determine a path on which the vehicle is traveling based on the location data;
determine, based on the location data, that a type of road of the path is a highway;
increase, responsive to the type of road being the highway and further responsive to a determination of a change from a non-highway road to the highway, a data collection rate for one or more sensors of the vehicle, wherein the data collection rate for the one or more sensors of the vehicle is increased, at least temporarily, each time there is a determination of a change from any non-highway road to any highway;
generate a congestion map using a sample resolution;
determine, using the congestion map, an aggregate speed for other vehicles traveling along the path when the location data was generated;
calculate, based on determining the speed of the vehicle is below the threshold speed, the location data, the speed of the vehicle, and the congestion map, a probability that the vehicle is experiencing a roadside event;
generate, when the probability exceeds a threshold value, notification data indicating the vehicle is experiencing a roadside event;
establish communication, using a wireless network, with another computing device associated with the vehicle;
transmit, to the other computing device, and based on the notification data, a request to initiate roadside assistance for the vehicle; and
cause the request to initiate roadside assistance to be displayed at a display of the other computing device.

12. The computing device of claim 11, wherein the GPS receiver is located in a mobile device associated with the vehicle.

13. The computing device of claim 11, wherein the GPS receiver is located in a telematics device installed in the vehicle.

14. The computing device of claim 11, wherein the speed indicated in the location data comprises a rate of travel of the GPS receiver calculated based on a Doppler shift of signals received by the GPS receiver relative to a known frequency for the received signals.

15. The computing device of claim 11, wherein the instructions, when executed by the processor, further cause the processor to generate the congestion map by:
obtaining a plurality of location data samples, wherein a location data sample of the plurality of location data samples comprises a time stamp indicating when the location data sample was captured, a geographic location at which the location data sample was taken, and a speed;
determining the sample resolution indicating a time period;
selecting a subset of the plurality of location data samples based on the sample resolution, wherein each location data sample in the selected subset has a time stamp occurring within the time period;

determining an aggregate speed based on the speed indicated in each location data sample in the subset of the plurality of location data samples; and generating the congestion map based on the geographic location and the aggregate speed for the geographic location.

16. The computing device of claim 11, wherein the sample resolution is a time-dependent sample resolution.

17. A non-transitory computer-readable medium storing instructions for controlling a processor, the instructions causing the processor to perform steps comprising:

obtaining location data for a vehicle from a global positioning system (GPS) receiver located in a mobile device associated with the vehicle, the location data comprising a geographic location of the vehicle and a speed of the vehicle when the location data was generated;

determining that a type of road travelled by the vehicle is a highway;

increasing, responsive to the type of road being the highway and further responsive to a determination of a change from a non-highway road to the highway, a data collection rate for one or more sensors of the vehicle, wherein the data collection rate for the one or more sensors of the vehicle is increased, at least temporarily, each time there is a determination of a change from any non-highway road to any highway;

determining that the speed of the vehicle is below a threshold speed for a time period;

calculating, based on the speed of the vehicle and the time period, a probability that the vehicle is in a trip pause;

generating a congestion map using a sample resolution;

determining, using the congestion map, a speed of a plurality of other vehicles;

determining, based on the probability that the vehicle is in a trip pause and the congestion map, that the vehicle is experiencing a roadside event;

generating notification data indicating the vehicle is experiencing a roadside event;

establishing communication, using a wireless network, with a computing device associated with the vehicle;

transmitting, to the computing device, and based on the notification data, a request to initiate roadside assistance for the vehicle; and causing the request to initiate roadside assistance to be displayed at a display of the computing device.

18. The non-transitory computer-readable medium of claim 17, wherein the GPS receiver generates the speed of the vehicle indicated in the location data by calculating a rate of travel of the GPS receiver based on a Doppler shift of signals received by the GPS receiver relative to a known frequency for the received signals.

19. The non-transitory computer-readable medium of claim 17, wherein a plurality of location data samples are received from the plurality of other vehicles.

* * * * *